Patented July 25, 1944

2,354,229

UNITED STATES PATENT OFFICE 2,354,229

ALLYLCHLOROMETHYL SULPHIDE

Lewis A. Walter, East Orange, N. J., assignor to The Maltbie Chemical Company, Newark, N. J., a corporation of New Jersey No Drawing. Application February 28, 1942, Serial No. 432,885

1 Claim. (Cl. 260—609)

The present invention relates to a new and useful composition of matter, to wit, a novel organic compound which I have designated allylchloromethyl sulphide, according to what I believe to be the accepted method of nomenclature; but which might also be described correctly as allylthiomethylene chloride. This novel compound has the formula:

$CH_2=CH-CH_2SCH_2Cl$

It is a colorless liquid, having a foul odor and a boiling point of approximately 52–55° C. at a pressure of about 15 mm. of mercury.

This compound has been found useful, and may be applied, in organic syntheses for the purpose of introducing the $CH_2=CH-CH_2SCH_2-$ group into organic molecules, for instance in preparing allylthiomethylene malonic esters.

Allylchloromethyl sulphide (allylthiomethylene chloride), having the above formula, has been prepared by the following procedure:

EXAMPLE

Allylchloromethyl sulphide

One mole of allyl mercaptan and 0.367 mole of paraformaldehyde (trioxymethylene) are stirred and chilled in an ice-salt bath and dry hydrogen chloride gas is passed into the mixture. As soon as the paraformaldehyde is dissolved, the cooling bath is removed and the dry hydrogen chloride gas passed through the mixture for several hours at room temperature. The aqueous layer of the reacted mixture is separated therefrom and the remaining oil dried by contact with anhydrous calcium chloride. The oil is separated from the drying agent by filtration and fractionally distilled to yield allylchloromethyl sulphide, a colorless liquid having a foul odor and boiling at approximately 52–55° C. (uncorrected) at a pressure of about 15 mm. of mercury.

I claim:

As a novel and useful organic chemical compound, allylchloromethyl sulphide having the formula: $CH_2=CH-CH_2SCH_2Cl$.

LEWIS A. WALTER.